United States Patent
Lazos

(10) Patent No.: US 7,938,002 B1
(45) Date of Patent: May 10, 2011

(54) APPARATUS FOR DETECTING WATER LEVEL MIXTURES IN FLUIDS

(76) Inventor: Ernesto Lazos, Plains, TX (US)

(*) Notice: Subject to any disclaimer, the term of this patent is extended or adjusted under 35 U.S.C. 154(b) by 408 days.

(21) Appl. No.: 12/127,264

(22) Filed: May 27, 2008

Related U.S. Application Data

(60) Provisional application No. 60/940,306, filed on May 25, 2007.

(51) Int. Cl.
*G01F 23/24* (2006.01)
*G01F 23/26* (2006.01)

(52) U.S. Cl. .................. 73/290 B; 73/290 R; 73/304 R

(58) Field of Classification Search ............ 33/715–720; 73/291–334, 290 B, 290 R, 304 C, 290 V
See application file for complete search history.

(56) References Cited

U.S. PATENT DOCUMENTS

| | | | | |
|---|---|---|---|---|
| 812,269 A * | 2/1906 | Horton | | 33/720 |
| 871,124 A * | 11/1907 | Knoblock et al. | | 33/715 |
| 1,443,357 A * | 1/1923 | Gardner | | 33/716 |
| 1,497,178 A * | 6/1924 | Lorenz | | 33/716 |
| 1,498,960 A | 6/1924 | Gardner | | |
| 1,555,802 A * | 9/1925 | Huber | | 324/325 |
| 1,695,701 A * | 12/1928 | Ludwig | | 33/716 |
| 2,157,024 A * | 5/1939 | Smith | | 15/220.4 |
| 2,265,736 A * | 12/1941 | Larson | | 33/715 |
| 2,275,474 A | 3/1942 | Scaramucci | | |
| 2,324,698 A * | 7/1943 | Hart | | 33/715 |
| RE22,367 E * | 8/1943 | Wiggins | | 33/719 |
| 2,361,064 A * | 10/1944 | Schlumberger | | 340/854.1 |
| 2,368,589 A * | 1/1945 | Bierman | | 33/720 |
| 2,437,134 A * | 3/1948 | Smith | | 324/696 |
| 2,480,490 A | 8/1949 | Mark, Jr. | | |
| 2,517,603 A | 8/1950 | Silverman | | |
| 2,547,344 A * | 4/1951 | Sanders | | 73/290 R |
| 2,593,252 A * | 4/1952 | Booth | | 204/400 |
| 2,792,566 A * | 5/1957 | Shanhouse et al. | | 340/620 |
| 2,874,574 A * | 2/1959 | Patureau | | 73/321 |
| 2,930,131 A * | 3/1960 | Mayes | | 33/720 |
| 3,148,542 A * | 9/1964 | Clift, Jr. | | 73/313 |
| 3,311,983 A * | 4/1967 | Green | | 33/715 |
| 3,482,447 A * | 12/1969 | Bennett | | 73/321 |
| 3,500,546 A * | 3/1970 | Pilcher | | 33/715 |
| 3,546,941 A * | 12/1970 | Weighell | | 73/321 |
| 3,558,861 A * | 1/1971 | Collins et al. | | 73/313 |
| 3,629,946 A * | 12/1971 | Parsons | | 33/720 |
| 3,888,011 A * | 6/1975 | Hunt, Jr. | | 33/720 |
| 3,909,948 A * | 10/1975 | Markfelt | | 33/716 |
| 4,052,612 A * | 10/1977 | Larkin | | 250/237 R |
| 4,123,753 A * | 10/1978 | Gravert | | 340/621 |
| 4,226,023 A * | 10/1980 | Gravert | | 33/720 |
| 4,236,314 A * | 12/1980 | Schmidt et al. | | 33/715 |
| 4,279,078 A | 7/1981 | Hinshaw et al. | | |

(Continued)

FOREIGN PATENT DOCUMENTS

GB 2046912 A * 11/1980

(Continued)

*Primary Examiner* — David A. Rogers
(74) *Attorney, Agent, or Firm* — Bracewell & Giuliani LLP

(57) ABSTRACT

A gauge tape device detects electronically conductive water level mixtures in various fluids through the use of electricity. The gauge tape device includes a gauge circuit and gauge line, having a weight attached thereto, which is lowered into a containment vessel holding water and other fluids. Once the weight contacts the water, the gauge circuitry activates an alert, which informs the user of the presence of water.

15 Claims, 3 Drawing Sheets

U.S. PATENT DOCUMENTS

| | | | | |
|---|---|---|---|---|
| 4,318,227 A | * | 3/1982 | Gravert | 33/720 |
| 4,345,466 A | * | 8/1982 | Lesser | 73/298 |
| 4,451,986 A | * | 6/1984 | Jones, Jr. | 33/720 |
| 4,455,531 A | * | 6/1984 | Arnold | 324/448 |
| 4,523,465 A | * | 6/1985 | Fasching et al. | 367/81 |
| 4,635,478 A | * | 1/1987 | Hope | 73/292 |
| 4,728,924 A | * | 3/1988 | Franklin | 73/290 R |
| 4,942,351 A | * | 7/1990 | Kronau | 318/642 |
| 5,043,912 A | * | 8/1991 | Reus | 702/54 |
| 5,065,139 A | * | 11/1991 | Shefsky | 340/620 |
| 5,144,836 A | * | 9/1992 | Webb | 73/319 |
| 5,243,860 A | * | 9/1993 | Habart | 73/291 |
| 5,319,964 A | * | 6/1994 | Stephenson et al. | 73/149 |
| 5,533,392 A | * | 7/1996 | Kira | 73/290 B |
| 5,729,206 A | * | 3/1998 | Divens | 340/618 |
| 5,821,864 A | * | 10/1998 | Knop et al. | 340/622 |
| 6,427,529 B1 | * | 8/2002 | Daly | 73/152.01 |
| 6,429,778 B1 | * | 8/2002 | Chuang | 340/623 |
| 6,481,110 B1 | * | 11/2002 | Butler | 33/393 |
| 6,536,277 B1 | * | 3/2003 | Chuang | 73/319 |
| 6,705,163 B1 | * | 3/2004 | Lattner et al. | 73/309 |
| 6,883,246 B1 | * | 4/2005 | Latham | 33/720 |

FOREIGN PATENT DOCUMENTS

| | | | |
|---|---|---|---|
| JP | 56014919 A | * | 2/1981 |
| JP | 58082125 A | * | 5/1983 |
| JP | 58096223 A | * | 6/1983 |
| JP | 59138924 A | * | 8/1984 |

* cited by examiner

APPARATUS FOR DETECTING WATER LEVEL MIXTURES IN FLUIDS

CROSS-REFERENCE TO RELATED APPLICATION

This application claims priority to provisional application 60/940,306, filed May 25, 2007.

FIELD OF THE INVENTION

This invention relates in general to fluid detection and, in particular, to a device which detects fluid levels in a container having an electrically conductive fluid layer below a non-conductive fluid layer.

BACKGROUND OF THE INVENTION

In containment vessels, such as those for crude oil, motor oils, alcohol, and various types of fuels, water can enter the vessel through contamination and condensation. Also, crude oil produced from wells often has some salt water content. Even if the water is first separated, some of the water will be entwined with the flow of crude oil into the containment vessel. A device is employed to determine the water level in the vessel, so that the water can be removed from the vessel and disposed of, leaving only pure fluids in the vessel. A preexisting method for determining the water level in a containment vessel requires applying a layer of chemical gauging paste by hand to a gauge line. The gauge line is then lowered into the vessel. Once the gauge line has reached the bottom of the vessel, an operator has to hold the gauge line steady for a period of time to allow the chemical gauging paste to activate and change colors depending on the fluid in contact with the paste. The gauge line must then be reeled up and the operator must look to see where the color changes on the gauge line to determine the water level in the tank. This method of gauging the water level in a containment vessel is inaccurate and time consuming.

SUMMARY

In view of the foregoing, embodiments of the present invention beneficially provide an apparatus which detects fluid level mixtures in various fluids through the use of electricity. Embodiments of the apparatus of the present invention advantageously provides a gauge circuit which can be used with a gauge line in order to quickly and efficiently notify an operator of the water level in a tank or other containment vessel. A gauge line, which has a weight attached thereto, can be lowered into a tank or other containment vessel holding water and other fluids. Once the weight comes into contact with water, the gauge circuitry of the present invention activates an alert device which notifies the operator of the presence of water. Therefore, using the depth indicators on the gauge line, the operator is able to ascertain the water level in the containment vessel.

Embodiments of the present invention also provide a gauge circuit which can be used with existing gauge lines. The present invention also utilizes a retractable ground cable which can be attached to a grounding location in order to prevent shock.

In view of the foregoing, the present invention provides an apparatus which utilizes the conductive properties of water in order to provide a quick, safe and reliable method of ascertaining the water level mixtures in practically any type of fluid.

BRIEF DESCRIPTION OF THE DRAWINGS

Some of the features and benefits of the present invention having been stated, others will become apparent as the description proceeds when taken in conjunction with the accompanying drawings, in which.

DETAILED DESCRIPTION OF THE INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figure 1:
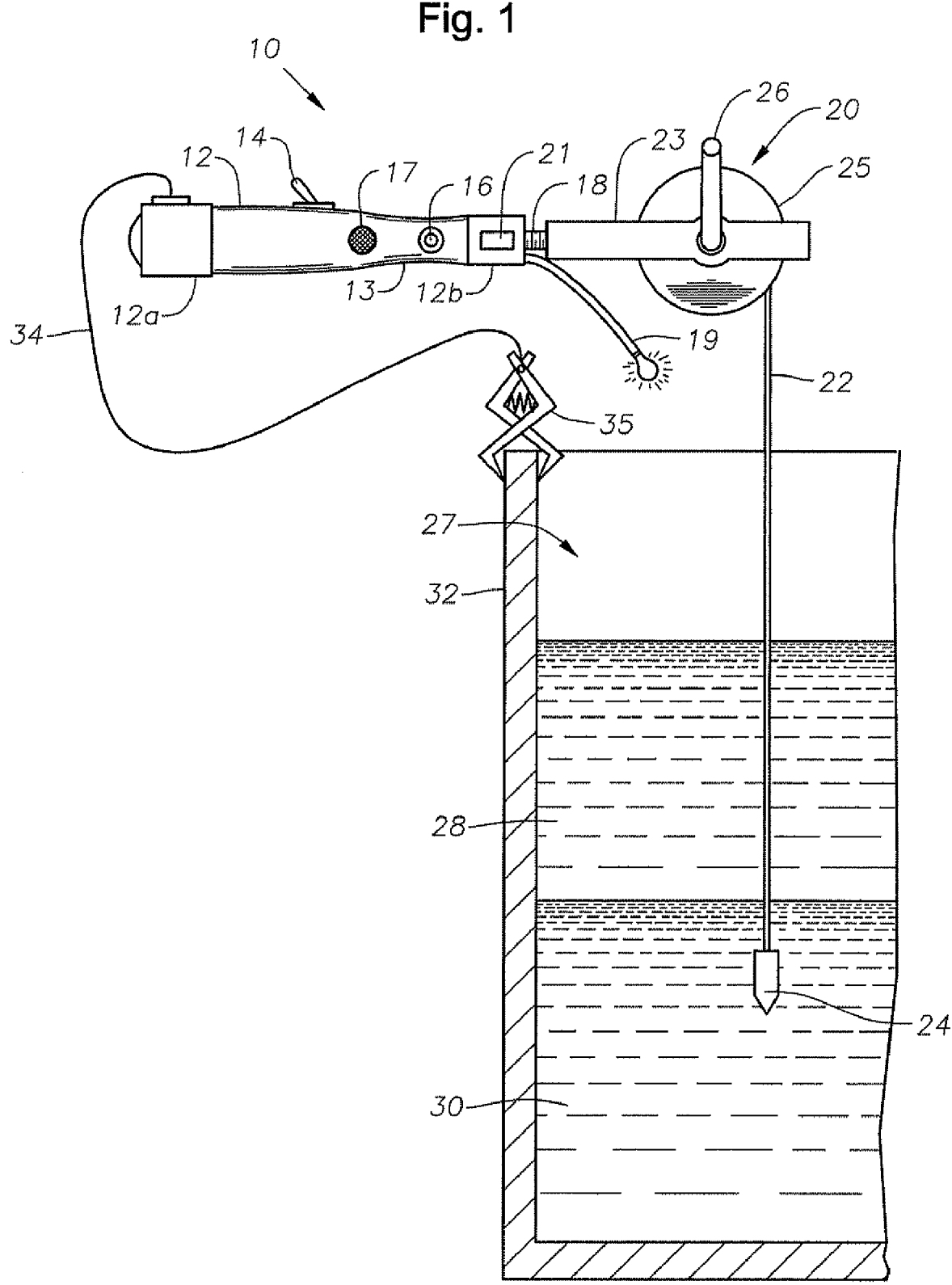
FIG. 1 is a perspective view of a gauge line in accordance with an exemplary embodiment of the present invention.

Referring to FIG. 1, an exemplary embodiment of a gauge line according to the present invention is illustrated. Water level gauge 10 includes housing 12 that encases the gauge circuitry which will be discussed later in this disclosure. Housing 12 defines a tubular shape having two ends 12*a* and 12*b*. However, housing 12 may take other forms without departing from the spirit and scope of this invention. For example, housing 12 can include a tapered end 13 which would allow for the use of a triggered line wiper as commonly used in the field.

A switch 14 is located on the outside surface of housing 12, which allows the operator to turn the gauge on and off. An alert device 16, such as, for example, an LED light or vibrator, is also located on the outer surface of housing 12 in order to alert the operator once water has been detected by the gauge circuit. In the exemplary embodiment of FIG. 1, a buzzer 17 is used as an alert device in addition to alert device 16.

Further referring to FIG. 1, an electrical contact 18 is located at housing end 12*b* and extends outwardly from housing 12. In an exemplary embodiment, electrical contact 18 can be, for example, a screw or other threaded contact which serves the dual purpose of acting both as a single electrical contact and a threaded attachment mechanism. When electrical contact 18 is a screw, for example, housing 12 can be attached to an existing gauge line; thereby allowing it to be sold as an attachment. However, in the alternative, housing 12 can be attached to a gauge line and sold or marketed as a singular product. In an exemplary embodiment, electrical contact 18 includes a ¼ inch thread.

Further referring to the exemplary embodiment of FIG. 1, an illumination device 19 is also attached to end 12*b* of housing 12. Illumination device 19 can be any variety of lights known in the art such as, for example, a telescoping light which can be directed in a desired direction. An ON/OFF switch 21 is also located at end 12*b* of housing 12 in order to activate and deactivate illumination device 19. Although illumination device 19 and ON/OFF switch 21 are located at end 12*b*, those ordinarily skilled in the art realize these components can be placed anywhere on housing 12 as desired.

Electrical contact 18 connects reel 20 to housing 12. Reel 20 has a metal yoke 23 and a metal spool 25. Threaded electrical contact 18 is attached to metal yoke 23. Reel 20 includes gauge line 22 which is a measuring tape formed of an electrical conductor, such as steel, that extends the length of gauge line 22. At the end of gauge line 22 is a weight 24 which allows the gauge circuitry inside housing 12 to detect the presence of water. Since gauge line 22 is wound around reel spool 25, a crank 26 is used by the operator to dispense or retract gauge weight 24 into or out of a tank 27 or other containment vessel.

In another exemplary embodiment, housing 12 can include a tapered end 13 extending from end 12*b*. In conjunction with such an embodiment, a triggered line wiper (not shown), such as those manufactured under the name "Little Joe®," can be attached at electrical contact 18. Also, in such an embodiment, reel 20 will be reversed (from that illustrated in FIG. 1) such that weight 24 is deployable and retractable in conjunction with the line wiper as readily understood by those in the art.

Further referring to FIG. 1, tank 27 contains water 30 and other fluids 28, such as for example, crude oil, motor oils, fuels and alcohol. Due to the physics of water 30 and oil 28, when each is present in tank 27, oil 28 will settle atop water 30 as illustrated. Tank 27 also includes tank housing 32, which can serve as a grounding point for the gauge circuitry located in housing 12. At housing end 12*a*, a grounding cable 34 is coupled to the gauge circuitry locating inside housing 12 and connects to a grounding point, such as, for example, tank housing 32.

Grounding cable 34 may be attached to housing 12 in any number of ways, including a ¼ inch threaded connection. In the event tank housing 32 cannot serve as a sufficient grounding point, such as if it's made of fiberglass, grounding cable 34 is attached to some other sufficient grounding point, such as a stake driven into the ground. A clamp 35 or other connective mechanism can be attached to the end of grounding cable 34 in order to effect a secure ground connection. In an alternative embodiment, grounding cable 34 can be retractable.

Figure 2:
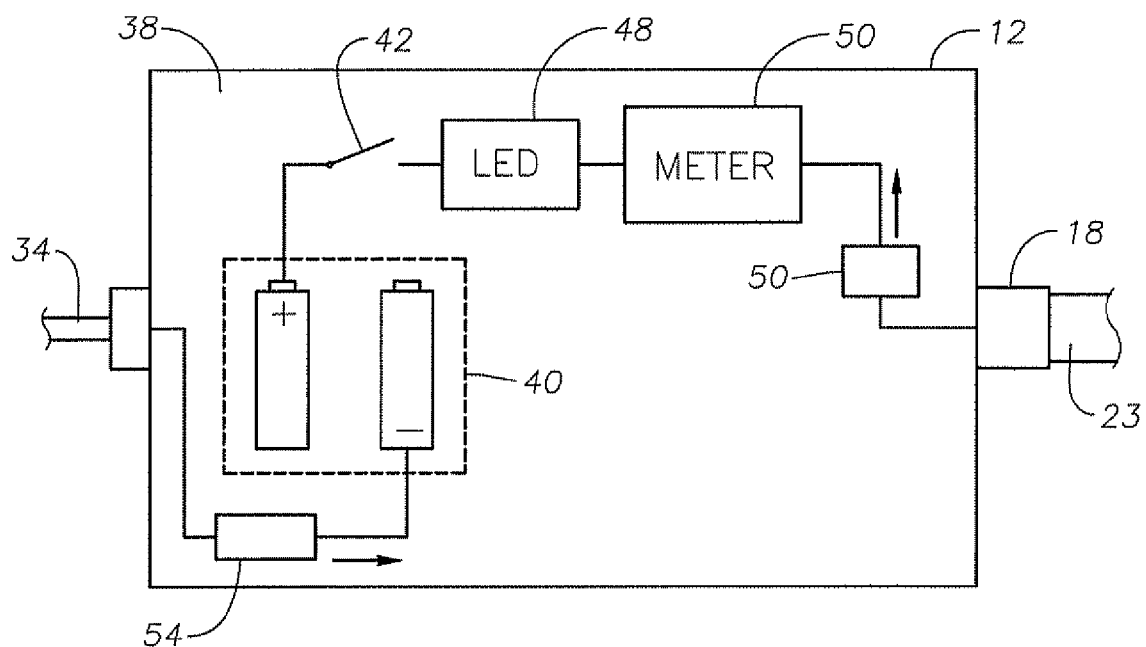
FIG. 2 is a circuit schematic of a gauge circuit according to an exemplary embodiment of the present invention.

Referring to FIG. 2, an exemplary embodiment of the gauge circuitry for the present invention will now be described. As illustrated, gauge circuitry 38 is contained inside housing 12. Power for gauge circuit 38 is supplied from power source 40, which can be, for example, two AA batteries. In an exemplary embodiment, a switch section 42 and alert devices, LED light source 48 and meter 50, are electrically coupled in series to the positive terminal of power source 40. However, in an alternative exemplary embodiment, a vibrator, buzzer, or other alert device can be used.

Further referring to FIG. 2, meter 50 is electrically coupled to screw 18 which allows electrical conduction through yoke 23 and spool 25 of reel 20, to gauge line 22 and on to weight 24. A diode 52 is also coupled between meter 50 and screw 18 in order to prevent current from flowing in the forward direction. Power source 40 is also connected to a ground source via ground cable 34. A second diode 54 is coupled between power source 40 and ground cable 34 in order to prevent current from flowing in a reverse direction. In the most preferred embodiment, diodes 52 and 54 are rated at 1 AMP.

Moreover, although not shown, illumination device 19 and ON/OFF switch 21 are also electrically coupled to power source 40. In addition, an automatic shut off switch could be utilized in the circuitry in order to protect from unintentional power drainage.

The gauge circuitry of FIG. 2 is only exemplary in nature and should not be construed as limiting. Those ordinarily skilled in the art will appreciate that the operation and design of the present invention is not limited to this disclosure nor the specific circuitry discussed herein, but is susceptible to various changes without departing from the spirit and scope of the invention. The inventor considers this disclosure to encompass all such circuitry.

Figure 3:
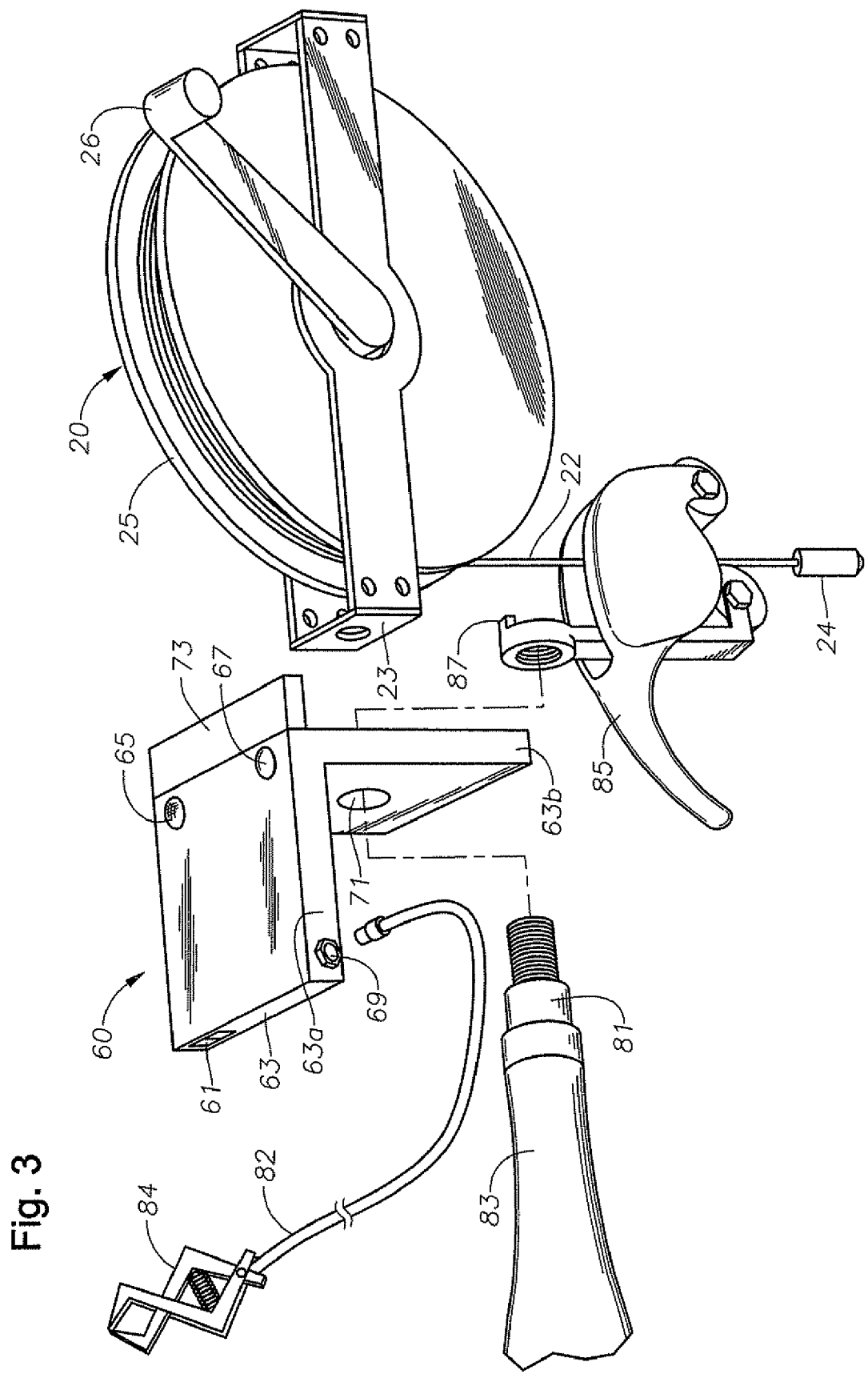
FIG. 3 is a perspective view of a gauge line in accordance with an alternate embodiment of the present invention.

Referring to FIG. 3, an alternate embodiment of a water level gauge according to the present invention is illustrated. Water level gauge 60 includes housing 63 that encases the gauge circuitry which will be discussed later in this disclosure. Housing 63 defines an L-shaped bracket having two sides 63*a*, 63*b* perpendicular to one another. However, housing 63 may take other forms without departing from the spirit and scope of this invention. A lip 73 is formed opposite the apex of the sides of housing 63. Lip 73 allows for the use of a triggered line wiper 85 as commonly used in the field.

A switch 61 is located on the outside surface of side 63*a* of housing 63, which allows the operator to turn the gauge on and off. An alert device 67, such as, for example, an LED light or vibrator, is also located on the outer surface of side 63*a* in order to alert the operator once water has been detected by the gauge circuit. In the alternate embodiment of FIG. 3, a buzzer 65 is used as an alert device in addition to alert device 67. A digital meter could also be employed in gage 60, which would display the depth of the gauge line at any given point.

Further referring to FIG. 3, an electrical contact hole 71 is located in and extends through side 63*b* of housing 63. In an exemplary embodiment, electrical contact 71 can be, for example, a washer or threaded contact set in side 63*b* of housing 63, which serves the dual purpose of acting both as a single electrical contact and an attachment mechanism. When electrical contact 71 is a threaded hole, for example, housing 63 can be attached to an existing gauge line and handle; thereby allowing it to be sold as an attachment.

Further referring to the alternate embodiment of FIG. 3, water gauge 60 is connected between reel handle 83 and reel 20. A handle adapter extension 81 may be necessary to ensure that sufficient threads extend to connect gauge 60, line wiper 85, and reel 20. Extension 81 could be screwed onto the end of the original handle screw, and would provide an extended screw with more thread exposure. Alternatively, conductor hole 71 may be countersunk to allow the original handle screw to extend through gauge 60, line wiper 85, and connect to reel 20. Reel 20 has a metal yoke 23 and a metal spool 25. Threaded electrical contact 81 is attached to metal yoke 23. Reel 20 includes gauge line 22 which is a measuring tape formed of an electrical conductor, such as steel, that extends the length of gauge line 22. At the end of gauge line 22 is a weight 24 which allows the gauge circuitry inside housing 63 to detect the presence of water. Since gauge line 22 is wound around spool 25, a crank 26 is used by the operator to dispense or retract gauge weight 24 into or out of a tank 27 or other containment vessel.

As indicated above, in conjunction with this alternate embodiment, a triggered line wiper 85, such as those manufactured under the name "Little Joe®," can be attached at electrical contact hole 71. Lip 73 of housing 63 abuts against lip 87 of wiper 85, ensuring that wiper 85 does not rotate about the handle axis. Also, in such an embodiment, reel 20 will be reversed (from that illustrated in FIG. 1) such that weight 24 is deployable and retractable in conjunction with the line wiper 85 as readily understood by those in the art.

At the end of side 63*a* of housing 63, grounding cable port 69 (FIG. 4) is located. Port 69 allows a grounding cable 82 to be inserted into port 69 and coupled to the gauge circuitry located inside housing 63. The other end of grounding cable 82 connects to a grounding point, such as, for example, tank housing 32 (FIG. 1). In the event tank housing 32 cannot serve as a sufficient grounding point, such as if it's made of fiberglass, grounding cable 62 is attached to some other sufficient grounding point, such as a stake driven into the ground. A clamp 84 or other connective mechanism can be attached to the end of grounding cable 82 in order to effect a secure ground connection. In an alternative embodiment, the grounding cable can be retractable.

Figure 4:
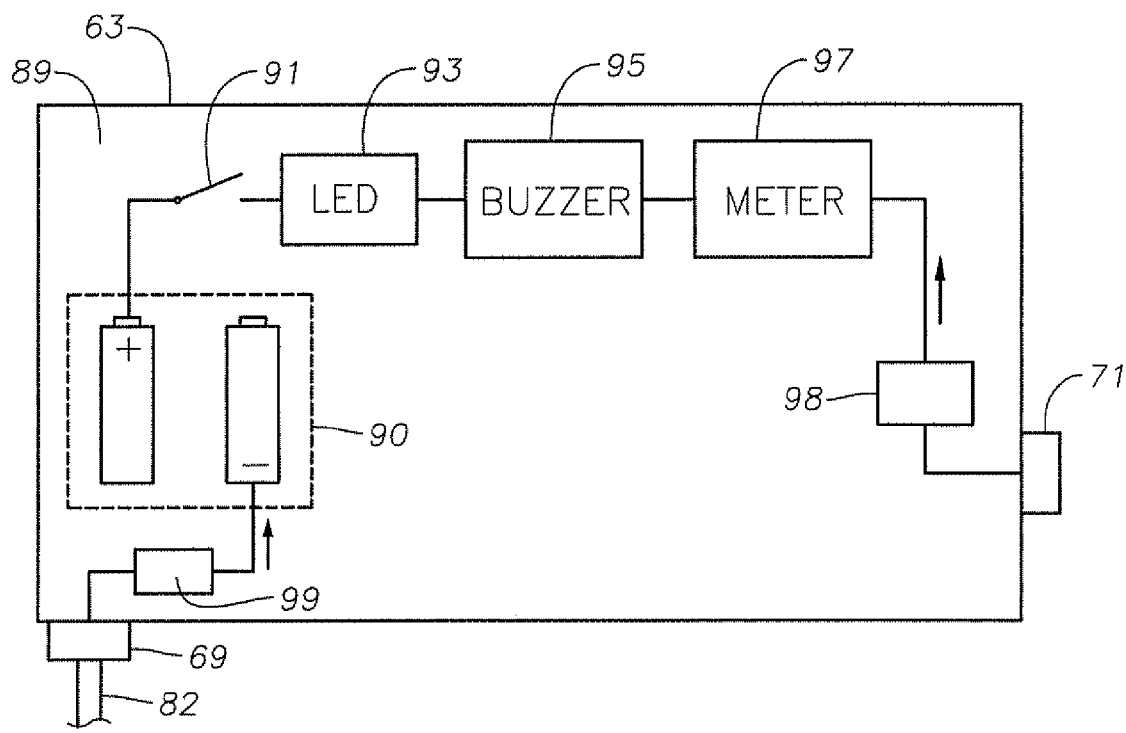
FIG. 4 is a circuit schematic of a gauge circuit according to the alternate embodiment of the present invention, as illustrated in FIG. 3.

Referring to FIG. 4, the gauge circuitry for the alternate embodiment of the present invention in FIG. 3 will now be described. As illustrated, gauge circuitry 89 is contained inside housing 63. Power for gauge circuit 89 is supplied from power source 90, which can be, for example, two AA batteries. In an exemplary embodiment, a switch section 91 and alert devices, LED light source 93, buzzer 95, and meter 97, are electrically coupled in series to the positive terminal of power source 90. However, in an alternative exemplary embodiment, a vibrator, digital display, or other alert device can be used.

Further referring to FIG. 4, meter 97 is electrically coupled to conductive hole 71 by a conductive lead from circuitry 89, which allows electrical conduction through reel 20, gauge line 22 and on to weight 24. A diode 98 is also coupled between meter 97 and hole 71 in order to prevent current from flowing in the forward direction. Power source 90 is also connected to a ground source via port 69 and ground cable 82. A second diode 99 is coupled between power source 90 and ground cable port 69 in order to prevent current from flowing in a reverse direction. In the most preferred embodiment, diodes 98 and 99 are rated at 1 AMP. In addition, an automatic shut off switch could be utilized in the circuitry in order to protect from unintentional power drainage.

The gauge circuitry of FIG. 4 should not be construed as limiting. Those ordinarily skilled in the art will appreciate that the operation and design of the present invention is not limited to this disclosure nor the specific circuitry discussed herein, but is susceptible to various changes without departing from the spirit and scope of the invention. The inventor considers this disclosure to encompass all such circuitry.

Referring to FIGS. 1 and 2, an exemplary method of using of the present invention will now be described. An operator will utilize water level gauge 10 to detect water level mixtures in virtually any type of fluid that is electrically resistive. If the operator is using a preexisting gauge line, he or she will remove the handle (not shown) by unscrewing it via threaded contact 18. However, in the alternative, the present invention can be constructed as a standalone unit including all components of FIG. 1. Once unscrewed, housing 12 can be screwed to, or otherwise coupled to, reel 20 via threaded contact 18. Once attached, gauge circuitry 38 will be electrically coupled to weight 24 through threaded contact 18, reel 20 and gauge line 22.

Once housing 12 is attached, the operator will clamp ground cable 34 to a suitable grounding point, such as tank housing 32. Once grounded, the operator will turn switch 42 into the "ON" position as indicated on housing 12. Once in the "ON" position, power source 40 will be connected to the other components on the circuit. Thereafter, the operator can begin lowering weight 24 into tank 27 via crank 26.

As weight 24 is lowered, it will first enter fluid 28, which for example, may be crude oil. As understood by those ordinarily skilled in the art, crude oil is a poor conductor of electricity; therefore electrical conduction will not occur while weight 24 is in fluid 28. Oil wells commonly produce salt water along with the oil. While distilled water is highly resistive, water with a saline content is conductive. Once weight 24 has reached water 30, electrical conduction will begin because of the conductivity of salt water, which is sensed by gauge circuitry 38 via the gauge line 22. Once sensed, gauge circuitry 38 will activate an alert, such as LED light source 48. Once the alert is activated, the operator will view, feel or hear the alert via alert device 16 located on housing 12. This will inform the operator that water has been located. The operator can then ascertain the water level via the measurement indicators on gauge line 22. The alternate embodiment of the present invention as illustrated in FIG. 3 and FIG. 4 operates identically to that of the invention in FIG. 2 and FIG. 3, with the only difference being that housing 63 will be placed on screw 81 of handle 83, which is then reattached to reel 20 (FIG. 4).

While this invention has been shown in only one of its forms, it should be apparent to those skilled in the art that it is not so limited but is susceptible to various changes without departing from the spirit and scope of the invention. For example, various circuitry, circuit components, and/or circuit designs can be utilized to achieve the function of the gauge circuitry. As such, those skilled in the art will appreciate that the operation and design of the present invention is not limited to this disclosure nor the specific circuitry discussed herein, but is susceptible to various changes without departing from the spirit and scope of the invention. In the drawings and specification, there have been disclosed illustrative embodiments of the invention and, although specific terms are employed, they are used in a generic and descriptive sense only and not for the purpose of limitation.

The invention claimed is:

1. An apparatus for detecting a level of electrically conductive fluid in a container below a non-conductive fluid layer, comprising:
   a handle with an electrically conductive threaded shaft extending from the handle on one end, along an axis of the handle;
   a housing with one portion of the housing perpendicular to the axis of the handle and containing an aperture through which the shaft extends, and another portion of housing transverse to the first portion, the housing having an electrically conductive surface in contact with and in electrical continuity with the threaded shaft;
   an electrically conductive yoke connected to the handle by the threaded shaft with the first portion of the housing sandwiched between the yoke and the handle, the yoke being in electrical continuity with the threaded shaft;
   an electrically conductive circular spool mounted to the yoke and capable of rotation relative to the yoke about an axis located in the center of the spool, the spool being in electrical continuity with the yoke;
   a lever extending from the spool, allowing the spool to be rotated relative to the yoke;
   a measuring tape formed from strip of metal and wrapped around the spool, with one end of the tape secured to and in electrical continuity with the spool, the tape defining a single conductive path, and a solid metal electrically conductive weight device attached to and in electrical continuity with the other end;
   a battery carried within the housing and electrically connected to the conductive surface of the housing;
   a ground wire connected to the battery and having a free end extending from the housing for connection to a grounding surface in electrical common with the conductive fluid, defining a current flow path from the battery to the conductive fluid; and
   an indicator that provides a signal when a current passes.

2. The apparatus of claim 1, wherein said one end of the ground wire comprises a clamp.

3. An apparatus for detecting an electrically conductive fluid level in a container below a layer of a non-conductive fluid, comprising:
- a reel having an electrically conductive yoke, an electrically conductive spool in electrical continuity with the yoke, and a lever extending from the spool, allowing the spool to be rotated relative to the yoke;
- a housing connected to the yoke by an electrically conductive fastener;
- a measuring tape formed of a strip of metal wrapped around the spool, with one end of the tape secured to the spool in electrical continuity with the spool, and a metal electrically conductive weight device attached to the other end of the tape in electrical continuity with the tape;
- a battery carried within the housing and having one terminal electrically connected to the fastener;
- a ground wire having one end electrically connected to another terminal of the battery and another end configured for releasable attachment to a grounding surface that is electrically common with the electrically conductive fluid, creating a circuit so at to pass a current from the battery through the fastener, the yoke, the spool, the tape, and the weight device and into the electrically conductive fluid; and
- an indicator connected with the circuit that provides a signal when the current passes.

4. The apparatus of claim 3, wherein the housing comprises a handle that attaches to the yoke with the fastener.

5. The apparatus of claim 3, further comprising a clamp attached to said another end of the ground wire.

6. The apparatus of claim 3, further comprising a handle attached to the conductive fastener, wherein the housing is at least partly sandwiched between the handle and the yoke.

7. The apparatus according to claim 1, wherein the tape defines a single conductive path between the weight and the spool.

8. The apparatus according to claim 1, wherein:
- the yoke has a threaded receptacle;
- the housing has a portion with a hole therethrough that registers with the threaded receptacle; and
- the fastener comprises a threaded shaft secured to a handle, extending through the hole and into threaded engagement with the threaded receptacle.

9. The apparatus according to claim 1, wherein the housing has a portion with an aperture therethrough, and the fastener comprises a threaded shaft extending through the aperture in the housing to secure the housing to the yoke.

10. The apparatus according to claim 9, wherein the portion of the housing containing the aperture is electrically conductive, and said one terminal of the battery is connected to the portion with an electrical conductor secured to said portion.

11. An apparatus for detecting a level of an electrically conductive fluid below a layer of non-conductive fluid in a container, comprising:
- a handle with an electrically conductive threaded shaft extending from one end;
- a housing containing an electrically conductive surface and an aperture through which the conductive threaded shaft extends, with the conductive surface in contact and electrical continuity with the threaded shaft;
- an electrically conductive yoke connected to the housing by way of the conductive threaded shaft and in electrical continuity with the conductive surface of the housing, the yoke being attached to and in electrical continuity with an electrically conductive circular spool capable of rotation relative to the yoke about an axis located in the center of the spool;
- a lever extending from the spool allowing the spool to be rotated relative to the yoke;
- a measuring tape of electrically conductive metal wrapped around and in electrical continuity with the spool, with one end of the tape secured to the spool, and a solid metal electrically conductive weight device attached to and in electrical continuity with the tape at the other end;
- a battery carried within the housing and electrically connected to the electrically conductive surface of the housing;
- a ground wire extending from the battery and the housing, the ground wire having a free end for attachment to a grounding surface in electrical common with the conductive fluid to complete a current path from the battery through the conductive surface of the housing, the threaded shaft, the yoke, the spool, the tape, the weight device, and into the conductive fluid when the weight device immerses into the conductive fluid; and
- an indicator on the housing that provides a signal when current passes.

12. The apparatus of claim 11, wherein the housing has at least a portion sandwiched between the handle and the yoke.

13. The apparatus of claim 11, further comprising a clamp attached to said one end of the ground wire.

14. The apparatus of claim 11, wherein the housing has a first portion perpendicular to an axis of the handle and a second portion transverse to the first portion.

15. The apparatus according to claim 11, wherein the tape defines a single conductive path between the weight and the spool.

* * * * *